US008780759B2

(12) United States Patent
Kim et al.

(10) Patent No.: US 8,780,759 B2
(45) Date of Patent: Jul. 15, 2014

(54) METHOD FOR TRANSMITTING AND RECEIVING GROUP DELETION INFORMATION

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 362 days.

(21) Appl. No.: 13/260,177

(22) PCT Filed: Apr. 23, 2010

(86) PCT No.: PCT/KR2010/002557
§ 371 (c)(1),
(2), (4) Date: Sep. 23, 2011

(87) PCT Pub. No.: WO2010/123308
PCT Pub. Date: Oct. 28, 2010

(65) Prior Publication Data
US 2012/0014287 A1  Jan. 19, 2012

Related U.S. Application Data

(60) Provisional application No. 61/172,204, filed on Apr. 23, 2009, provisional application No. 61/258,580, filed on Nov. 5, 2009, provisional application No. 61/261,285, filed on Nov. 13, 2009.

(51) Int. Cl.
*H04L 12/28* (2006.01)

(52) U.S. Cl.
USPC ............................................. 370/254

(58) Field of Classification Search
USPC ............................................. 370/254
See application file for complete search history.

(56) References Cited

U.S. PATENT DOCUMENTS

| 2003/0147411 A1 | 8/2003 | Goosman | |
| 2008/0101269 A1* | 5/2008 | Jung et al. | 370/312 |
| 2009/0059858 A1 | 3/2009 | Lee et al. | |
| 2009/0073940 A1* | 3/2009 | Shrivastava et al. | 370/336 |
| 2009/0092066 A1* | 4/2009 | Chindapol et al. | 370/277 |
| 2009/0103487 A1* | 4/2009 | Oh et al. | 370/329 |
| 2009/0103561 A1* | 4/2009 | Qi et al. | 370/468 |
| 2010/0182932 A1* | 7/2010 | Maheshwarl et al. | 370/254 |
| 2010/0266057 A1* | 10/2010 | Shrivastava et al. | 375/260 |

(Continued)

FOREIGN PATENT DOCUMENTS

WO   2006/071052   7/2006

*Primary Examiner* — Mark Rinehart
*Assistant Examiner* — Christopher R Crompton
(74) *Attorney, Agent, or Firm* — Lee, Hong, Degerman, Kang & Waimey

(57) ABSTRACT

A method for transmitting and receiving group configuration information on a user equipment is disclosed. The user equipment receives information on group deletion of the user equipment from a base station. The user equipment transmits an acknowledgement (ACK) signal about the received information on the group deletion to the base station. In this case, the information on the group deletion is configured as a separate extended header type or a type that an extended header is piggybacked on a specific downlink packet to be transmitted to the user equipment. Preferably, the user equipment decodes the received information on the group deletion of the user equipment. The user equipment successfully decodes the information on the group deletion and is then able to transmit the acknowledgement (ACK) signal about the received information on the group deletion to the base station.

18 Claims, 4 Drawing Sheets

(a)

(b)

(56) References Cited

U.S. PATENT DOCUMENTS

2011/0194538 A1* 8/2011 Zheng et al. .................. 370/335
2011/0255518 A9* 10/2011 Agrawal et al. ............... 370/335
2012/0275422 A1* 11/2012 Kang et al. .................... 370/329

* cited by examiner

METHOD FOR TRANSMITTING AND RECEIVING GROUP DELETION INFORMATION

CROSS-REFERENCE TO RELATED APPLICATIONS

This application is the National Stage filing under 35 U.S.C. 371 of International Application No. PCT/KR2010/002557, filed on Apr. 23, 2010, which claims the benefit of U.S. Provisional Application Nos. 61/172,204, filed on Apr. 23, 2009, 61/258,580, filed on Nov. 5, 2009, and 61/261,285, filed on Nov. 13, 2009, the contents of which are all hereby incorporated by reference herein in their entirety.

TECHNICAL FIELD

The present invention relates to a wireless communication system, and more particularly, to a method of transmitting and receiving group deletion information.

BACKGROUND ART

Generally, a group resource allocation mechanism is a method of allocating resources to a plurality of users belonging to one group using a bitmap in order to reduce overhead attributed to a control message sent to a user equipment by a base station. In allocating resources to user equipments individually, this resource allocating method using the bitmap compresses and transmits such information as resource allocation position information (e.g., resource start offset, resource size, etc.), burst MCS (modulation and coding selection) level information and the like, thereby reducing overhead attributed to the control information transmission.

Figure 1:
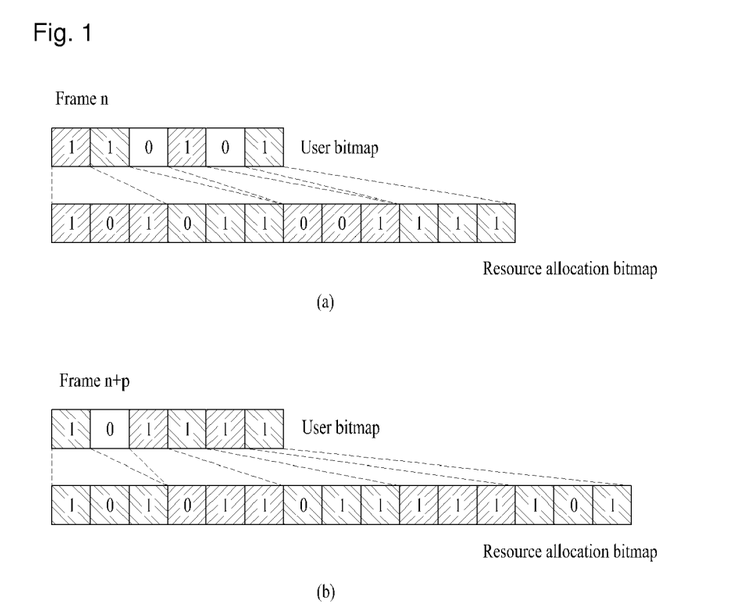
FIG. 1 is a diagram of a bitmap used by a group resource allocating method.

FIG. 1 is a diagram of a bitmap used by a group resource allocating method.

Referring to FIG. 1, a base station uses bitmaps to inform user equipments belonging to a group of resource allocation information. A user bitmap, which is a first bitmap, indicates whether a prescribed user equipment in a specific group is scheduled at a corresponding timing point. Each bit of the user bitmap corresponds one-to-one to user equipments belonging to a group. In FIG. 1 (a) and FIG. 1 (b), users up to 6 can belong to one group. If each bit is represented as '', it indicates a user schedule in a current frame (i.e., a user having a resource allocated thereto). In the $n^{th}$ frame shown in FIG. 1 (a), $1^{st}$, $2^{nd}$, $4^{th}$ and $6^{th}$ users are scheduled. A user equipment can be aware of its position order in a group by acquiring information for a user bitmap. In this case, the user bitmap is received from a base station when it is added to the corresponding group. A resource allocation bitmap indicates resource allocation information (modulation & coding selection (MCS) and resource size) of the scheduled users.

In FIG. 1 (a) and FIG. 1 (b), information on one user equipment is represented as 3 bits. Since total 4 users are scheduled in the $n^{th}$ frame, a size of a resource allocation map becomes 12 bits. Referring to FIG. 1 (b), since total 5 users are scheduled in the $(n+p)^{th}$ frame, a size of a resource allocation map includes total 15 bits.

Group control information is the information used in configuring and allocating a resource for at least one user (or user equipment) within one user group. Two kinds of operations are required for group scheduling as follows. First of all, an operation of allocating one user to one group is required. In order to add one user to one group in downlink (DL) or uplink (UL), a base station sends a group configuration MAC management message and a group configuration A-MAP IE to a user equipment. Secondly, an operation of allocating resources to users within one group is required. In order to allocate resources to at least one or more users within one group, a base station transmits a DL/UL group resource allocation A-MAP IE to a user equipment. In this case, the DL/UL group resource allocation A-MAP IE is included in a user-specific resource assignment within A-MAP region. The DL/UL group resource allocation A-MAP IE includes a bitmap which indicates scheduled users or signals resource allocation, modulation & coding scheme (MCS) and a resource size.

Table 1 shows DL/UL group resource allocation A-MAP IE according to a related art.

TABLE 1

| Syntax | Size in bits* | Description/Notes |
| --- | --- | --- |
| A-MAP IE Type | [4] | A-MAP IE types distinguish between UL/DL, SU/MU, OL/CL MIMO operation, persistent/non-persistent allocation, basic/extended IEs including GRA |
| Resource Offset | [6] [8] | Indicates starting LRU for resource assignment to this group |
| ACID | TBD | Requested for explicit assignment of a single ACID group. Implicit cycling of ACIDs needs not to be used according to IEEE 802.16e from initial ACID value. |
| HARQ Re Tx Indicator | TBD | Indicates whether this group resource allocation IE is for HARQ retransmission or initial transmission. |
| User Bitmap Size | [2] [5] | Size of user bitmap: This may be unnecessary if a user bitmap size is included in configuration message/A-MAP IE. |
| User Bitmap | Variable | This is a bitmap indicating a scheduled user in one group. Size of this bitmap is equal to a user bitmap size. |
| Resource Allocation Bitmap descriptor | TBD | Attributes required for decoding MCS group type, packet/resource size type information or resource allocation bitmap |
| Resource Assignment Bitmap | Variable | Indicates MCS/resource size for each scheduled user. |
| Padding | Variable | Padding to reach byte boundary |
| MCRC | [16] | 16 bit masked CRC |

Referring to Table 1, when a specific group is assigned to one user equipment or a specific user equipment is deleted from an assigned group, it is able to use A-MAP (group configuration A-MAP IE) or a MAC management message (group configuration MAC management message).

Table 2 shows formats of information elements (IEs) included in A-MAP IE or MAC management message for group configuration.

TABLE 2

| Syntax | Size in bits* | Description/Notes |
| --- | --- | --- |
| Management message Type/A-MAP IE Type | 4 | |
| Group ID | 5 | |
| Start frame | | Indicates that 1$^{st}$ group resource allocation A-MAP IE is transmitted after transmission of this message. The unit is the number of frame. |
| MCS/resource size set ID | TBD | |
| User Bitmap index | 5 | |
| Initial ACID | TBD | Indicates a start of ACID used for group resource allocation |
| N_ACID | TBD | Indicates the number of ACID used for group resource allocation |
| CH indicator | 1 | Indicates whether a default MAC header of MPDU is a generic MAC header or a compact MAC header.0b0: Generic MAC header0b1: Compact header |
| Flow ID | 4 | Indicates a flow ID included in this group. |
| Padding | Variable | Padding to reach byte boundary |
| MCRC | [16] | 16 bit masked CRC |

Referring to Table and Table 2, if a group is configured using A-MAP for user equipments, it is necessary to define an additional A-MAP IE type for the delivery of information having low frequency of occurrence. Moreover, since modulation and coding scheme (MCS) used in transmitting the A-MAP is lower than that used in transmitting a message, if a size of information for the group configuration is greater than that of information of general resource allocation A-MAP IE, the A-MAP for the group configuration occupies more resources.

Meanwhile, in case of using a message type, information can be transmitted in a manner of occupying relatively small resources if MCS higher than that of A-MAP IE is used. Moreover, when there is a DL MPDU (MAC protocol data unit) which is to be transmitted to a user equipment having a good channel, if there is a spare resource to include a group configuration message, a base station is able to send the group configuration message by concatenating the DL MPDU and the group configuration message with each other.

Yet, when a channel status of a user equipment is poor, if a group configuration message needs to be sent as a single message type, since a basic A-MAP IE indicating allocation information of message should be transmitted, an additional resource is occupied. Therefore, this case may cause a problem of occupying more resources than those for the case of configuring a group using A-MAP IE.

Thus, in order to add/delete a user equipment to/from a group, a base station sends a group configuration MAC message including information related to the addition and deletion to the corresponding user equipment. Having received the group configuration MAC message, the user equipment receives an assignment to a group based on the information included in the message. A bit size used for a MAC message for the group configuration is explained as follows. First of all, for the group addition, it is able to use 26 bits (including group ID, allocation periodicity, user bitmap information, HARQ information (initial ACID, N ACID, etc.), burst size information, resource allocation information and the like). For the group deletion, it is able to use 5 bits (1-bit deletion flag, 4-bit FID). For the group addition or the group deletion, there is 83-bit overhead (GMH+FEH: 3~4 bytes, CRC (cyclic redundancy checking): 2 bytes, RLC/Security (PN in IEEE 802.16m system): 3 bytes, MAC message type: 1 byte, Padding to MAC message: 3 bits)) in common.

Thus, when the group deletion is performed, 83-overhead (16-times overhead) is generated to send 5-bit information. However, there is a problem that the unnecessary overhead considerably lowers efficiency of resource use.

SUMMARY OF INVENTION

Technical Problem

However, as mentioned in the foregoing description, the unnecessary overhead considerably lowers efficiency of resource use.

Solution to Problem

Accordingly, the present invention is directed to a method of transmitting and receiving group deletion information that substantially obviates one or more of the problems due to limitations and disadvantages of the related art.

An object of the present invention is to provide a method for transmitting and receiving group deletion information, a method for transmitting and receiving group deletion information.

Another object of the present invention is to provide a user equipment, by which information on deleting a specific user equipment from a specific group can be received.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for receiving group deletion information, which is for deleting a mobile station from a specific group in a wireless communication system, includes receiving information on group deletion of the mobile station from a base station and transmitting an acknowledgement (ACK) signal for the received information on the group deletion to the base station, wherein the information on the group deletion is configured as a separate extended header type or a type that piggyback extended header type piggybacked on a specific downlink packet to be transmitted to the mobile station. To further achieve these and other advantages and in accordance with the purpose of the present invention, a method for transmitting group deletion information, which is on group deletion of a mobile station in a wireless communication system, includes transmitting information on the group deletion of the mobile station to the mobile station and receiving an acknowledgement (ACK) signal for the received information on the group deletion from the mobile station, wherein the information on the group deletion is configured as a separate extended header type or piggyback extended type piggybacked on a specific downlink packet to be transmitted to the mobile station.

To further achieve these and other advantages and in accordance with the purpose of the present invention, mobile station (MS)_for receiving information on deleting a specific mobile station from a specific group in a wireless communication system, includes a receiving module receiving information on group deletion of the mobile station from a base station and a transmitting module transmitting an acknowledgement (ACK) signal for the received information on the group deletion to the base station. In this case, the information on the group deletion is configured as a separate extended header type or a piggyback extended type piggybacked on a specific downlink packet to be transmitted to the mobile station.

Preferably, the mobile station (MS) further includes a decoding module configured to decode the received information on the group deletion.

It is to be understood that both the foregoing general description and the following detailed description are exemplary and explanatory and are intended to provide further explanation of the invention as claimed.

Advantageous Effects of Invention

Accordingly, the present invention provides the following effects and/or advantages.

First of all, a base station transmits information on a group configuration in type of a separate extended header or a type that an extended header is piggybacked on a downlink traffic to transmit to a user equipment, thereby reducing waste of resources.

Secondly, the present invention reduces a delay of a group configuration process of a user equipment, thereby enabling fast processing.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE 802.16 system, they are applicable to other random mobile communication systems except unique features of the IEEE 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a mobile terminal is a common name of such a mobile or fixed user stage device as an advanced mobile station (AMS), a user equipment (UE), a mobile station (MS) and the like and that a base station is a common name of such a random node of a network stage communicating with a terminal as a node B, an eNode B, a base station, an access point (AP) and the like.

In a mobile communication system, an advanced mobile station (AMS) can receive information in downlink from a base station. The advanced mobile station (AMS) is also able to transmit information in uplink. The information transmitted/received by the advanced mobile station (AMS) includes data and various kinds of control information. And, various physical channels exist according to types and usages of the information transmitted or received by the advanced mobile station (AMS).

In the following description, a method of configuring and transmitting a group to an advanced mobile station (AMS) using an extended header according to the present invention is explained.

Figure 2:
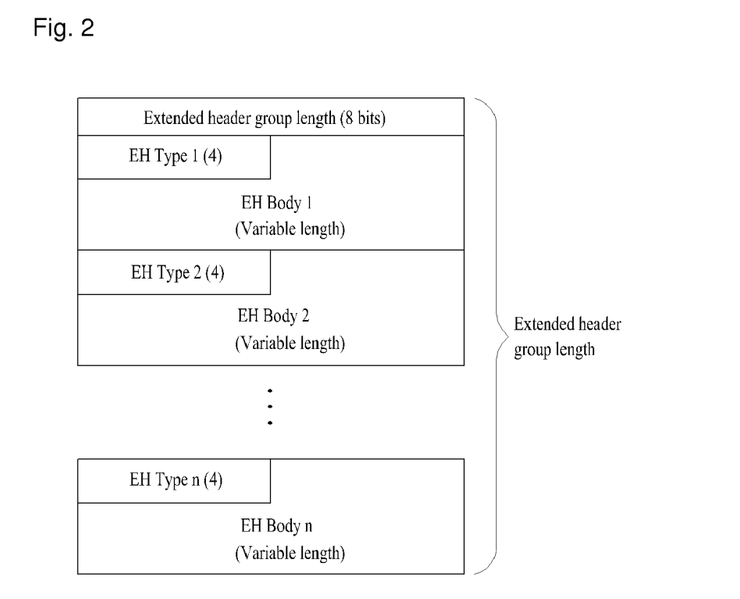
FIG. 2 is a diagram for a format of an extended header defined by IEEE 802.16m system.

FIG. 2 is a diagram for a format of an extended header defined by IEEE 802.16m system.

Referring to FIG. 2, whether an extended header is included may be indicated by an extended header bit in a MAC header. An extended header group is located behind the MAC header. And, the extended header group is not encoded. A field of an extended header group format, as shown in FIG. 2, consists of an extended header group length part and an extended header (EH) body part. In particular, the extended header group length part is represented as 8 bits, while the extended header body parts have variable lengths.

An extended header group field is described as follows. First of all, an extended header group length field indicates a total length of an extended header group including all extended headers and an extended header group length. An extended header type can be constructed with 4 bits. A size of the extended header is determined by the extended header type. The extended header including the extended header type is byte-aligned. The extended header type can include one of a multiplexed extended header type, a message ACK extended header type, a sleep control extended header type, a correlation matrix feedback extended header type, an MIMO feedback extended header type, a piggybacked bandwidth request extended header type, and the like.

In the following description, a method for transmitting information for managing (adding, deleting, changing, etc.) a group of advanced mobile stations (AMS) in various forms at a base station (BS) to an advanced mobile station (AMS) will be explained. In particular, a base station may transmit information on a group configuration to an advanced mobile station (AMS) in one of a group configuration MAC control message type, an extended header type, a MAC control message on service generation, and the like.

First of all, a method of informing an advanced mobile station (AMS) using a MAC control message on service generation will be described. In order to assign a group to one advanced mobile station (AMS), a base station is able to assign a group to an advanced mobile station in a manner that information for assigning a group is included in a MAC control message (DSA-REQ/RSP) for service setting in a service setup process instead of using a unicast MAC control message. In this case, since it is unnecessary to allocate a resource for a unicast MAC control message transmission, a resource of a downlink control region can be saved.

Figure 3:
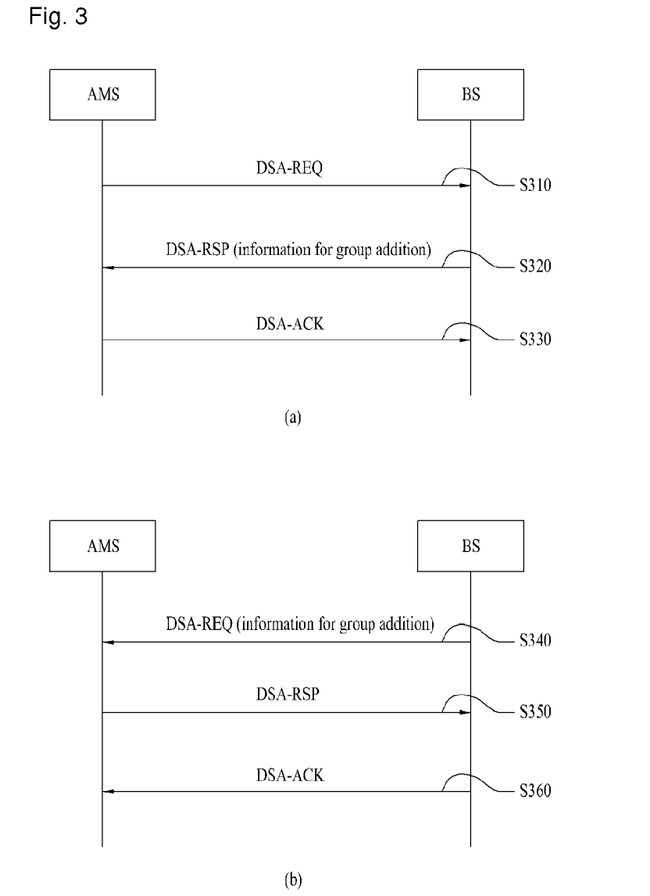
FIG. 3 is a diagram of an example for a method for a base station to assign a group to a user equipment using a DSA (dynamic service addition) message within a MAC control message.

FIG. 3 is a diagram of an example for a method for assigning a group to a user equipment (AMS: advanced mobile station) at a base station using a DSA (dynamic service addition) message within a MAC control message.

Referring to FIG. 3 (a), an advanced mobile station (AMS) is able to initiate a dynamic service addition (DSA) procedure. In particular, the advanced mobile station (AMS) firstly transmits a DSA request message (DSA-REQ) to a base station [S310]. Upon receiving the DSA-REQ, the base station transmits a DSA-response message (DSA-RSP) including information for assigning a group (cf. contents in Table 2) to the advanced mobile station (AMS) [S320]. In this case, since flow identifier (FID) information on a corresponding service is included in the DSA message, a flow ID may not be included in the information for the group allocation. Upon receiving the DSA-RSP from the base station, the advanced mobile station (AMS) transmits an acknowledgement message (DSA-ACK) indicating that the DSA-RSP has been received to the advanced mobile station [S330].

Referring to FIG. 3 (b), unlike FIG. 3 (a), a base station may initiate a DSA procedure as follows. First of all, a base station may transmit a DSA-REQ message including information for assigning a group to an advanced mobile station (AMS) [S340]. The advanced mobile station (AMS) then transmits a DSA-RSP message to the base station in response to the DSA-REQ message received from the base station [S350].

Meanwhile, a base station may use a DSC message within a MAC control message to change a group.

Figure 4:
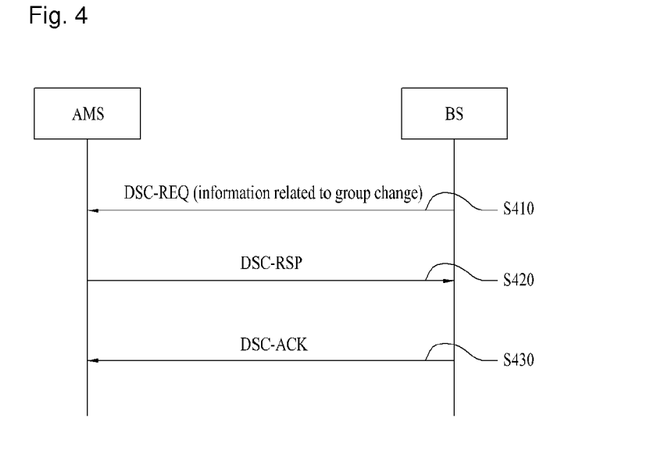
FIG. 4 is a diagram of an example for a method for a base station to change a group using a DSC message.

FIG. 4 is a diagram of an example for a method for changing a group using a DSC message at a base station. Referring to FIG. 4, an advanced mobile station (AMS) receives a DCS (dynamic service change) request message (DSC-REQ) from a base station [S410]. In this case, the base station may transmit the DSC-REQ in a manner that information required for the group allocation and deleted group ID information, as shown in Table 2, are included in the DSC-REQ message. If so, the advanced mobile station (AMS) transmits a DSC response message (DSC-RSP) to the base station [S420]. Afterwards, if the advanced mobile station (AMS) receives a DSC-ACK message from the base station [S430], the advanced mobile station (AMS) may perform a group change. Thus, if the DSC message is used for the group change, the advanced mobile station (AMS) is unable to perform the group change until receiving the DSC-ACK signal from the base station. Therefore, a delay time for performing the group change may be increased.

In order to reduce the delay due to the group change, information related to a group configuration (addition, deletion, change) may be transmitted using an extended header. In case of using the extended header, it is able to quickly assign a group to an advanced mobile station (AMS) by HARQ ACK/NACK procedure without using a separate response message. Moreover, if there is a packet to be transmitted from a base station to an advanced mobile station (AMS), the extended header may be transmitted in a manner of being piggybacked on the packet to be transmitted. Therefore, separate resource allocation information is not necessary.

Table 3 shows a format of an extended header a base station transmits to an advanced mobile station (AMS) to add to a group.

TABLE 3

| Name | Length (bit) | Description |
| --- | --- | --- |
| Group ID | 5 | Group identifier |
| Start frame | 2 | Indicates when the first GRA A-MAP IE is transmitted after this message is sent. The unit is the number of frame. |
| MCS/resource size set ID | TBD | |
| User Bitmap index | 5 | Indicates User Bitmap index to the AMS |
| Initial ACID | TBD | Indicates the start of ACID used for group resource allocation. |
| N_ACID | TBD | Indicates the number of ACIDs used for group resource allocation |
| CH indicator | 1 | Indicates whether the default MAC header of MPDU is the generic MAC header or the compact header0b0: Generic MAC header0b1: Compact header |
| Flow ID | 4 | Indicates the flow id which is included in this group. |

Table 4 shows an example for a format of an extended header a base station transmits to an advanced mobile station (AMS) to delete from a specific group.

TABLE 4

| Name | Length (bit) | Description |
| --- | --- | --- |
| Group ID | 5 | Group identifier |
| User Bitmap index | 5 | Indicating a user bitmap index to an advanced mobile station (AMS). |

Referring to Table 4, a base station may inform an advanced mobile station (AMS) using an extended header that it will be deleted from a specific group. In case of deleting an advanced mobile station (AMS) from a specific group, the base station may inform group ID information of a group corresponding to the AMS and user bitmap index information only to the advanced mobile station (AMS).

Figure 5:
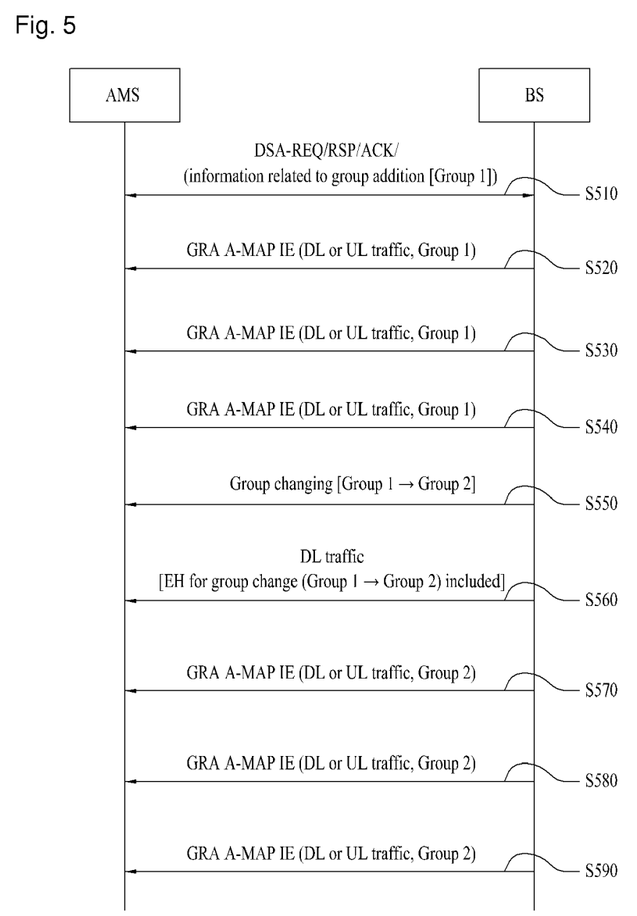
FIG. 5 is a diagram of an example for a method of deleting a group using an extended header.

FIG. 5 is a diagram of an example for a method for deleting a group using an extended header.

Referring to FIG. 5, in case of attempting to assign a specific group for group resource allocation for a corresponding service in a service generating process, an advanced mobile station (AMS) or a base station may transmit a service generation message in a manner that information related to a group addition is included in the service generation message [S510]. After the base station has assigned a group to the advanced mobile station (AMS), the base station transmits group resource allocation IE (group allocation resource A-MAP-IE) to the corresponding advanced mobile station (AMS) [S520 to S540]. If the base station determines that a group of the advanced mobile station (AMS) needs to be changed, the base station may change the group of the advanced mobile station (AMS) [S550]. When the base station changes the group assigned to the corresponding advanced mobile station (AMS), if there is a downlink traffic (or packet) to be transmitted to the advanced mobile station (AMS), an extended header for a group change may be transmitted by being included in the downlink traffic [S560]. In this case, an extended header format for the group change may follow one of the types shown in Tables 1 to 4. In particular, the extended header for the group change includes group deletion information (group ID) for Group 1 and group assignment information (e.g., group ID, MCS, resource size set, user bitmap index, etc.) on Group 2. If the group is changed through the extended header, the base station may allocate a resource to the advanced mobile station (AMS) using the changed information (information on Group 2) [S570 to S590].

In general, when a group is changed, a step of deleting a group and a step of adding a group may be simultaneously performed. This means that a procedure of changing a group may include a step of deleting a group. As mentioned in the foregoing description, in order to reduce unnecessary overhead generated from deleting a group using a MAC message of the related art, it is necessary that group deletion related information (flow ID and UL/DL indicator), which may be piggybacked on MPDU (MAC protocol data unit), on the group deletion need to be defined in an extended header.

When a group for an advanced mobile station (AMS) is deleted, if there is a downlink (DL) packet to be transmitted to the advanced mobile station (AMS), a base station may transmit an extended header including information related to a corresponding DL MAC protocol data unit (MPDU) to the advanced mobile station (AMS) in a manner that the extended header is piggybacked on the DL packet. Upon receiving an extended header related to a group deletion, the advanced mobile station (AMS) may delete the information related to the corresponding group assignment based on the information included in the extended header. By HARQ operation of the DL MPDU, the base station can be aware whether the advanced mobile station (AMS) has received the extended header related to the group deletion. For instance, in case of receiving information on a group deletion, which is an extended header type, from a base station, an advanced mobile station (AMS) may transmit an acknowledgement (ACK) signal to the base station.

If a base station receives an ACK signal for a reception of DL HARQ burst from an advanced mobile station (AMS), the base station may delete group information on the advanced mobile station (AMS). On the contrary, if a base station receives a NACK signal for a reception of DL HARQ burst from an advanced mobile station (AMS), the base station performs a retransmission process of DL burst including an extended header related to a group deletion by HARQ operation.

In case that a group addition or a group change is performed, a base station may transmit information about the group addition or group change to AMS using an extended header. Basic actions of the group addition or the group change are identical to those of the aforesaid group deletion.

Table 5 shows one example for a format of an extended header transmitted for a base station to delete a group assigned to a specific advanced mobile station.

TABLE 5

| Syntax | Size (bit) | Notes |
| --- | --- | --- |
| Group deletion extended header ( ) { | 5 | Group identifier |

TABLE 5-continued

| Syntax | Size (bit) | Notes |
| --- | --- | --- |
| Type | TBD | Group deletion extended header type |
| Flow ID (FID) | 4 | Indicating FLOW ID connected to a group to delete. |

Referring to Table 5, information on a type of a group deletion extended header type and information on a flow ID connected to a group to delete are included in an extended header for a group deletion, which is transmitted to an advanced mobile station from a base station. If the advanced mobile station receives the group deletion extended header from the base station, the advanced mobile station can be aware of being deleted from a prescribed group by checking the flow ID.

Table 6 shows another example for a format of an extended header transmitted for a base station to delete a group assigned to a specific advanced mobile station.

TABLE 6

| Syntax | Size (bit) | Notes |
| --- | --- | --- |
| Group deletion extended header ( ) { | | Group identifier |
| Type | TBD | Group deletion extended header type |
| DL/UL indicator | 1 | Indicating whether a corresponding flow is DL (0) or UL (1). |
| Flow ID (FID) | 4 | Indicating FLOW ID connected to a group to delete. |

Table 7 shows another example for a format of an extended header transmitted for a base station to delete a group assigned to a specific advanced mobile station.

TABLE 7

| Syntax | Size (bit) | Notes |
| --- | --- | --- |
| Group deletion extended header ( ) { | | |
| Type | TBD | Group deletion extended header type |
| DCI | 1 | Deletion control indicatorThis field indicates whether a deleted flow is the same flow ID included in AGMH (advanced generic MAC header).0: Delete a group for a flow corresponding to a flow id included in AGMH.1: Delete a group for a flow different from a flow id included in AGMH. Therefore, FID further follows behind. |
| If (DCI == 1) { | | |
| FID | 4 | Indicating FLOW ID connected to a group to delete. |
| } | | |

Table 8 shows another example for a format of an extended header transmitted for a base station to delete a group assigned to a specific advanced mobile station.

TABLE 8

| Syntax | Size (bit) | Notes |
|---|---|---|
| Group deletion extended header ( ) { | | |
| ID | | |
| Type | TBD | Group deletion extended header type |
| DCI | 1 | Deletion control indicatorThis field indicates whether a deleted flow is the same flow ID included in AGMH (advanced generic MAC header).0: Delete a group for a flow corresponding to a flow id included in AGMH.1: Delete a group for a flow different from a flow id included in AGMH. Therefore, FID further follows behind. |
| If (DCI == 1) { | | |
| DL/UL indicator | 1 | Indicating whether a corresponding flow is DL (0) or UL (1). |
| FID | 4 | Indicating FLOW ID connected to a group to delete. |
| } | | |

Table 9 shows another example for a format of an extended header transmitted for a base station to delete a group assigned to a specific advanced mobile station.

TABLE 9

| Syntax | Size (bit) | Notes |
|---|---|---|
| Group deletion extended header ( ) { | | |
| Type | TBD | Group deletion extended header type |
| DCI | 1 | Deletion control indicatorThis field indicates whether a deleted flow is the same flow ID included in AGMH (advanced generic MAC header).0: Delete a group for a flow corresponding to a flow id included in AGMH.1: Delete a group for a flow different from a flow id included in AGMH. Therefore, FID further follows behind. |
| If (DCI == 1) { Do { | | |
| DL/UL indicator | 1 | Indicating whether a corresponding flow is DL (0) or UL (1). |
| FID | 4 | Indicating FLOW ID connected to a group to delete. |
| End | 1 | Indicating whether more information is further included.0: indicating another 'FID' and 'End' fields are followed.1: indicating no more 'FID' and 'End' fields are followed. |
| } while (!End) } } | | |

Referring to Table 9, 'End' field indicates whether another 'FID' and 'End' fields are followed. For instance, when a base station deletes at least one group assigned to an advanced mobile station, it is able to use the 'End' field by setting the 'End' filed to 1.

Table 10 shows another example for a format of an extended header transmitted for a base station to delete a group assigned to a specific advanced mobile station.

TABLE 10

| Syntax | Size (bit) | Notes |
|---|---|---|
| Group deletion extended header ( ) { | | |
| Type | TBD | Group deletion extended header type |
| DCI | 1 | Deletion control indicatorThis field indicates whether a deleted flow is the same flow ID included in AGMH (advanced generic MAC header).0: Delete a group for a flow corresponding to a flow id included in AGMH.1: Delete a group for a flow different from a flow id included in AGMH. Therefore, FID further follows behind. |
| If (DCI == 1) { Do { | | |
| DL/UL indicator | 1 | Indicating whether a corresponding flow is DL (0) or UL (1). |
| FID | 4 | Indicating FLOW ID connected to a group to delete. |
| End | 1 | Indicating whether more information is further included.0: indicating another 'FID' and 'End' fields are followed.1: indicating no more 'FID' and 'End' fields are followed. |
| } while (!End) } } | | |

Table 11 shows another example for a format of an extended header transmitted for a base station to delete a group assigned to a specific advanced mobile station.

TABLE 11

| Syntax | Size (bit) | Notes |
|---|---|---|
| Group deletion extended header ( ) { | | |
| Type | TBD | Group deletion extended header type |
| DCI | 2 | Deletion control indicator00: Delete all groups assigned to AMS. Therefore, FID is not included.01: Delete a group for a flow corresponding to a flow id included in AGMH. Therefore, FID is not included. 10: Delete a group corresponding to a flow id different from a group corresponding to flow id included in AGMH. Therefore, FID further follows behind. |
| If (DCI == 1) { Do { | | |
| DL/UL indicator | 1 | Indicating whether a corresponding flow is DL (0) or UL (1). |
| FID | 4 | Indicating FLOW ID connected to a group to delete. |
| End | 1 | Indicating whether more information is further included.0: indicating another 'FID' and 'End' fields are followed.1: indicating no more 'FID' and 'End' fields are followed. |
| } while (!End) } } | | |

Referring to Table 11, unlike Tale 10, a deletion control indicator has a 2-bit size. As the deletion control indicator is represented as the 2-bit size, it is able to indicate to delete all groups assigned to an advanced mobile station and is also able to indicate to a flow ID further follows behind by deleting a group for another flow ID without deleting a group for a flow ID included in AGMH (advanced generic MAC header).

A group deletion extended header may be included in a group resource allocation DL burst transmitted via a group resource or may be included in a DL burst (MPDU) transmitted to an advanced mobile station via a generic resource. Occasionally, a base station attaches an AGMH (advanced generic MAC header) to a group deletion extended header and may then transmit the group deletion extended header including the AGMH to an advanced mobile station without a DL packet transmitted to the advanced mobile station. Fields related to the group deletion included in the group deletion extended header are usable for a group message or group A-MAP IE.

Table 12 shows one example for a format of a group configuration MAC control message, which is sent to an advanced mobile station by a base station, including information for deleting a group assigned to an advanced mobile station.

TABLE 12

| Syntax | Size in bits | Description/Notes |
| --- | --- | --- |
| MAC control message type | 8 | |
| Deletion flag | 1 | Flag to signal whether this message includes addition or deletion information.0: Flow is added to a group 1: Flow is explicitly deleted from a group |
| If{Deletion Flag == 0}{ | | |
| DL/UL indicator | 1 | Indicating whether a corresponding flow is DL (0) or UL (1). |
| Flow ID | 4 | Identifies the flow that is added to group for GRA |
| Group STID | 12 | Group STID of the group to which the flow is added. Base station will mask an assigned group STID on CRC of group resource allocation A-MAP IE. And, mobile station shall mask Group STID on CRC in decoding the group resource allocation A-MAP IE. |
| ... | ... | ... |
| } else { | | |
| DCI | 1 | Deletion control indicator0b0: Delete all groups assigned to AMS. Therefore, FID is not included.0b1: Delete a group for a flow ID determined by BS. Therefore, at least one FID further follows. |
| If (DCI == 0b1) { Do { | | |
| DL/UL indicator | 1 | Indicates whether a corresponding flow is DL (0) or UL (1). |
| Flow ID | 4 | Indicates the flow that is deleted from group for GRA. |
| End | 1 | Indicating whether more information is included.0: Indicating another 'FID' and 'End' fields are followed.1: Indicating no more 'FID' and 'End' fields are followed. |
| } while (!End) } } | | |
| Padding | Variable | Padding to align to byte boundary |

Referring to Table 12, a base station may transmit a group configuration AMC control message including information on deletion of an assigned group to an advanced mobile station. Using this group configuration MAC control message, the base station may transmit the information for adding/deleting an advanced mobile station to/from a group to the advanced mobile station. In doing so, the group addition information for adding a specific advanced mobile station to a group may not be included in the group configuration MAC control message for the clarity and simplicity of the corresponding message. This group configuration MAC control message, as shown in Tables 5 to 11, may include DCI field, UL/DL indicator field, FID field, End field and the like included in the group deletion extended header.

Table 13 shows another example for a format of an extended header transmitted for a base station to delete a group assigned to a specific advanced mobile station.

TABLE 13

| Syntax | Size (bit) | Notes |
| --- | --- | --- |
| Group deletion extended header ( ) { | | |
| Type | TBD | Group deletion extended header type |
| DL/UL indicator | 1 | Indicates whether a corresponding flow is DL (0) or UL (1). |
| If (DL/UL indicator == 1) { | | |
| FID | 4 | Indicates FLOW ID connected to a group to delete. FID is included only if uplink. |
| } | | |

Table 14 shows another example for a format of an extended header transmitted for a base station to delete a group assigned to a specific advanced mobile station.

TABLE 14

| Syntax | Size (bit) | Notes |
| --- | --- | --- |
| Group deletion extended header ( ) { | | |
| Type | TBD | Group deletion extended header type |
| DL/UL indicator | 1 | DL or UL |
| FID | 4 | Flow ID |
| } | | |

A base station piggybacks a group management extended header on a DL MAC protocol data unit (MPDU) and may then transmit them to an advanced mobile station together. In this case, a format of the group management extended header transmitted to the advanced mobile station by the base station can be represented as Table 15.

Table 15 shows one example for a format of an extended header transmitted to an advanced mobile station by a base station for group management.

TABLE 15

| Syntax | Size (bit) | Notes |
|---|---|---|
| Group management extended header ( ) { | | |
| Type | TBD | Group management extended header |
| Group management extended header (GMEH sub-type | 1 | Group management extended header sub-type0: group deletion0: group change |
| If (GMEH sub-type == Group deletion(0)){ | | |
| DL/UL indicator | 1 | DL or UL |
| FID (or Group ID) | 4 | Deleted Flow ID (deleted group ID. In this case, size 5) |
| } else { | | In case of group change, deleted group information and added group information are included. |
| Group ID indicator | 1 | |
| Deleted Group ID | 4 | |
| Information of new group | Variable | Informations of newly added group (Group ID, User bitmap index, burst size, allocation size, etc.) |
| ... | ... | ... |
| } } | | |

Moreover, a base station may update a previously assigned item via a group configuration MAC control message. The base station may transmit the group configuration MAC control message for group addition to an advanced mobile station. In this case, the group configuration MAC control message for the group addition may include group ID information on a group to have the advanced mobile station added thereto and user bitmap index information assigned to the advanced mobile station to be added to the group. In case of successfully receiving the group configuration MAC control message for the group addition, the advanced mobile station may transmit an ACK signal to the base station. Moreover, if a group is already assigned to a corresponding flow ID based on flow ID (FID) information included in the group configuration MAC control message for the group addition, the advanced mobile station updates previous group information into new group information. In this case, the information related to the group may include at least one of a group ID, a user bitmap index, a burst size, an allocation size and the like.

In brief, a base station enables information on group configuration to be included in a service generation message on generating a service and then sends the service generation message. Therefore, the base station needs not to additionally use a resource for a DL channel generated in transmitting the information via a separate group configuration MAC control message. And, the base station may reduce a delay that may be generated from using a DSC (dynamic service change) message using an extended header.

Moreover, if there is a packet to transmit to an advanced mobile station, the base station piggybacks an extended header on the corresponding packet to transmit to the advanced mobile station and then transmits them together. Therefore, the waste of resource for resource allocation information transmission can be reduced.

Figure 6:
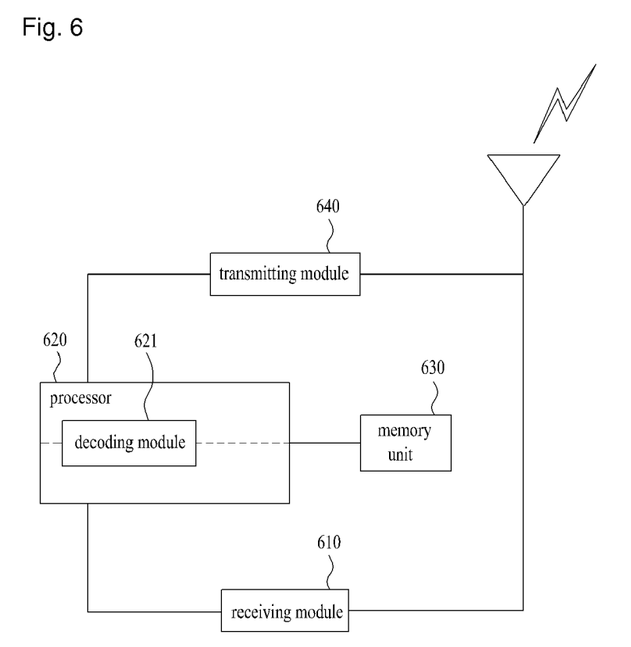
FIG. 6 is a block diagram of a configuration of a user equipment device according to a preferred embodiment of the present invention.

FIG. 6 is a block diagram of a configuration of a user equipment device according to a preferred embodiment of the present invention.

Referring to FIG. 6, a user equipment device can include a receiving module 610, a processor 620, a memory unit 630 and a transmitting module 640.

The receiving module 610 receives signals, data and information transmitted from an external device such as a base station and the like. The receiving module 610 can receive information on group deletion of a user equipment. In this case, the information is configured as a separate extended header type or a type that an extended header is piggybacked on a specific DL packet that is to be transmitted to the user equipment.

The processor 620 can include a decoding module 621 and the like. The decoding module 621 is able to decode the information on the group deletion of the user equipment, which was received by the receiving module 610.

The user equipment device includes at least one of a microprocessor, a microcontroller, a digital signal processor (DSP), combinations thereof, and the processor 620 known to those skilled in the art. Detailed operations/functions of the user equipment device are determined by execution of software commands and routines stored in such at least one memory unit 630 for storing data and programs executable by the corresponding processor 620, which is associated with the processor, as a random access memory (RAM), a dynamic random access memory (DRAM), a read-only memory (ROM) and their equivalents.

The memory unit 630 can store the signals, data or information externally received by the user equipment device or the information operated by the processor 620 for prescribed duration.

The transmitting module 640 may transmit signals, data, information and the like to such an external device as a base station and the like. And, the transmitting module 640 may transmit an acknowledgement (ACK) signal about the received information on the group deletion to the base station.

Figure 7:
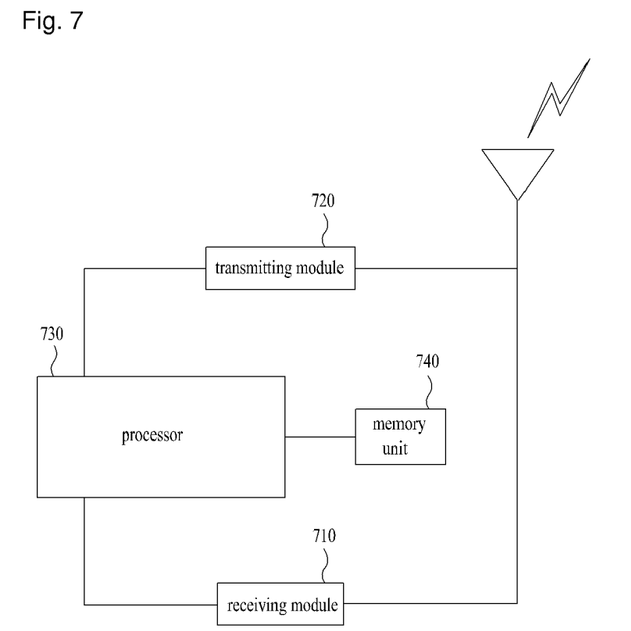
FIG. 7 is a block diagram of a configuration of a base station device according to a preferred embodiment of the present invention.

FIG. 7 is a block diagram of a configuration of a base station device according to a preferred embodiment of the present invention.

Referring to FIG. 7, a base station device may include a receiving module 710, a transmitting module 720, a processor 730 and a memory unit 740.

The transmitting 720 may transmit information on group deletion of an user equipment to the user equipment. In this case, the information is configured as a separate extended header type or a piggyback extended header type piggybacked on a specific DL packet that is to be transmitted to the user equipment. And, the receiving module 710 may receive ACK/NACK signal about the information on the group deletion from at least one user equipment having received the information on the group deletion transmitted by the transmitting module 720.

The base station device includes at least one of a microprocessor, a microcontroller, a digital signal processor (DSP), combinations thereof, and the processor 730 known to those skilled in the art. Detailed operations/functions of the base station device are determined by execution of software commands and routines stored in such at least one memory unit 740 for storing data and programs executable by the corresponding processor 730, which is associated with the processor, as a random access memory (RAM), a dynamic random access memory (DRAM), a read-only memory (ROM) and their equivalents.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

Industrial Applicability

A method for transmitting and receiving group deletion information is applied to mobile communication system such as IEEE 802.16m, LTE system, etc.

The invention claimed is:

1. A method for performing a group resource allocation procedure by a mobile station (MS) in a wireless communication system, the method comprising:
   receiving a group configuration MAC control message from a base station (BS); and
   transmitting an acknowledgement (ACK) signal for the received group configuration MAC control message to the BS,
   wherein the group configuration MAC control message comprises:
      a deletion flag that signals whether the group configuration MAC control message includes addition information for adding a flow of the MS to a group or deletion information for deleting a flow of the MS from the group;
      a flow identifier (FID) that identifies the flow of the MS that is added to or deleted from the group; and
      a downlink (DL)/uplink (UL) indicator that indicates whether the flow of the MS that is added to or deleted from the group is a flow for the DL or a flow for the UL.

2. The method of claim 1, wherein the group configuration MAC control message further includes a group identifier that identifies the group to which the flow is added, only if the deletion flag indicates the flow is to be added to the group.

3. The method of claim 1, wherein the group configuration MAC control message excludes a group identifier that identifies the group, if the deletion flag indicates the flow is to be deleted from the group.

4. The method of claim 1, wherein the group configuration MAC control message further includes a size and an index of a user bitmap, only if the deletion flag indicates the flow is to be added to the group.

5. The method of claim 1, wherein the group configuration MAC control message further includes a transmission time interval (TTI) indicator that defines a number of subframes spanned by an allocated resource, only if the deletion flag indicates the flow is to be added to the group.

6. The method of claim 1, wherein the group configuration MAC control message further includes a periodicity of resource allocation of the group, only if the deletion flag indicates the flow is to be added to the group.

7. The method of claim 1, wherein the group configuration MAC control message further includes information on a burst size, if a burst size of a last group resource allocation for the flow is changed.

8. The method of claim 1, further comprising:
   receiving a group resource allocation MAP Information Element (IE) including:
      a user bitmap indicating scheduled MSs in the group, and
      a resource offset indicating starting logical resource unit (LRU) for resource assignment to the group.

9. A method of performing a group resource allocation procedure by a base station (BS) in a wireless communication system, the method comprising:
   transmitting a group configuration MAC control message to a mobile station (MS); and
   receiving an acknowledgement (ACK) signal for the transmitted group configuration MAC control message from the MS,
   wherein the group configuration MAC control message comprises:
      a deletion flag that signals whether the group configuration MAC control message includes addition information for adding a flow of the MS to a group or deletion information for deleting a flow of the MS from the group;
      a flow identifier (FID) that identifies the flow of the MS that is added to or deleted from the group; and
      a downlink (DL)/uplink (UL) indicator that indicates whether the flow of the MS that is added to or deleted from the group is a flow for the DL or a flow for the UL.

10. The method of claim 9, wherein the group configuration MAC control message further includes a group identifier that identifies the group to which the flow is added, only if the deletion flag indicates the flow is to be added to the group.

11. The method of claim 9, wherein the group configuration MAC control message excludes a group identifier that identifies the group, if the deletion flag indicates the flow is to be deleted from the group.

12. The method of claim 9, wherein the group configuration MAC control message further includes a size and an index of a user bitmap, only if the deletion flag indicates the flow is to be added to the group.

13. The method of claim 9, wherein the group configuration MAC control message further includes a transmission time interval (TTI) indicator that defines a number of subframes spanned by an allocated resource, only if the deletion flag indicates the flow is to be added to the group.

14. The method of claim 9, wherein the group configuration MAC control message further includes a periodicity of resource allocation of the group, only if the deletion flag indicates the flow is to be added to the group.

15. The method of claim 9, wherein the group configuration MAC control message further includes information on a burst size, if a burst size of a last group resource allocation for the flow is changed.

16. The method of claim 9, further comprising:
   transmitting a group resource allocation MAP Information Element (IE) including:
      a user bitmap indicating scheduled MSs in the group, and
      a resource offset indicating starting logical resource unit (LRU) for resource assignment to the group.

17. A mobile station (MS) configured to perform a group resource allocation procedure in a wireless communication system, the MS comprising:
   a receiving circuit configured to receive a group configuration MAC control message from a base station (BS); and
   a transmitting circuit configured to transmit an acknowledgement (ACK) signal for the received group configuration MAC control message to the BS,
   wherein the group configuration MAC control message comprises:
      a deletion flag that signals whether the group configuration MAC control message includes addition information for adding a flow of the MS to a group or deletion information for deleting a flow of the MS from the group;
      a flow identifier (FID) that identifies the flow of the MS that is added to or deleted from the group; and
      a downlink (DL)/uplink (UL) indicator that indicates whether the flow of the MS that is added to or deleted from the group is a flow for the DL or a flow for the UL.

18. A base station (BS) configured to perform a group resource allocation procedure in a wireless communication system, the BS comprising:
   a transmitting circuit configured to transmit a group configuration MAC control message to a mobile station (MS); and
   a receiving circuit configured to receive an acknowledgement (ACK) signal for the transmitted group configuration MAC control message from the MS,
   wherein the group configuration MAC control message comprises:
      a deletion flag that signals whether the group configuration MAC control message includes addition information for adding a flow of the MS to a group or deletion information for deleting a flow of the MS from the group;
      a flow identifier (FID) that identifies the flow of the MS that is added to or deleted from the group; and
      a downlink (DL)/uplink (UL) indicator that indicates whether the flow of the MS that is added to or deleted from the group is a flow for the DL or a flow for the UL.

* * * * *